United States Patent [19]

Parkinson et al.

[11] Patent Number: 4,477,493

[45] Date of Patent: Oct. 16, 1984

[54] PRODUCTION OF REACTION-BONDED SILICON CARBIDE BODIES

[75] Inventors: Kenneth Parkinson, Wirral; Peter Kennedy, Broughton, both of England

[73] Assignee: United Kingdom Atomic Energy Authority, London, England

[21] Appl. No.: 486,444

[22] Filed: Apr. 19, 1983

[30] Foreign Application Priority Data

Apr. 30, 1982 [GB] United Kingdom ................. 8212640

[51] Int. Cl.$^3$ .............................................. B05D 3/02
[52] U.S. Cl. .................................... 427/228; 264/29.3; 264/29.4; 264/29.5; 264/56; 423/346; 427/402; 427/430.1
[58] Field of Search ............................ 427/228, 430.1; 423/346; 264/65, 29.5, 66, 56, 29.4, 29.3

[56] References Cited

U.S. PATENT DOCUMENTS 3,079,273  2/1963  Johnson ............................ 427/228
3,882,210  5/1975  Crossley ............................ 423/346

*Primary Examiner*—Michael R. Lusignan
*Assistant Examiner*—Janyce A. Bell
*Attorney, Agent, or Firm*—Larson and Taylor

[57] ABSTRACT

Reaction-bonded silicon carbide artefacts are produced by siliconizing a green body formed from a coherent mixture of silicon carbide and carbon powders. The surface of the green body is coated with a paste comprising silicon powder suspended in a carbonizable viscous medium which, on heating of the coating, is converted to an open cellular carbon structure and then, on siliconizing the green body, to a silicon carbide skeleton through which molten silicon is drawn.

3 Claims, No Drawings

PRODUCTION OF REACTION-BONDED SILICON CARBIDE BODIES

BACKGROUND OF THE INVENTION

This invention relates to the production of reaction-bonded silicon carbide bodies.

Reaction-bonded silicon carbide bodies are produced by reaction sintering of a coherent mixture (or green body) of carbon and silicon carbide powders in the presence of molten silicon (hereinafter referred to as "siliconising") whereby the carbon in the mixture is converted to bonding silicon carbide and a substantially continuous silicon carbide matrix is formed in a substantially continuous free silicon phase.

In one method of siliconising molten silicon is drawn upwards through a green body of carbon and silicon carbide by capillary action. Porosity has accordingly to be provided in that body to allow infiltration of the molten silicon. The rate of climb of the molten silicon through such a green body is proportional to the pore size in the body and inversely proportional to the height reached. The greater the porosity, therefore, the more rapid the infiltration of silicon and the completion of the conversion of all the carbon in the green body to bonding silicon carbide but, the greater the porosity which is provided, the higher the proportion of silicon in the reaction-sintered body and the presence of an excess of free silicon may have a deleterious effect on the desired properties of the reaction-sintered body. On the other hand, if the porosity is insufficient, the infiltration may be inhibited to such an extent that conversion of carbon to silicon carbide is incomplete or inpracticably slow and in considering this factor account has to be taken not only of the initial porosity but of the increase in molecular volume when carbon is converted to silicon carbide so that there is a tendency for the newly formed, bonding silicon carbide to fill the available porosity and block off the flow of molten silicon through the body. Reducing the proportion of carbon in the green body and hence the formation of bonding silicon carbide does not necessarily provide a satisfactory solution, however, because, in general, the lower the proportion of carbon in the green body the higher the proportion of free silicon present after siliconising.

The introduction of additional porosity in the outer layer of a green body by reaction of the carbon therein with silicon monoxide vapour has already been described, for example, in U.S. Pat. No. 3,495,939. By this method surface porosity can be enhanced from about 10% up to 40% and the surface pore size from about 1 micron to up to 10 microns. The rate of climb is thus increased by about an order of magnitude and, because silicon can now infiltrate the body laterally as well as vertically a 450 mm length can be siliconised in about four hours but double the length (900 mm) would however take four times as long (at least 16 hours). This may be commercially unacceptable. The present invention seeks to provide means whereby the rate of climb by molten silicon may be further accelerated and also to avoid or reduce the gradation in free silicon content which may be a disadvantageous result of the production of reaction-sintered bodies using the above method.

It has already been proposed in U.S. Pat. No. 4,301,132 that composite green bodies should be produced in which one portion contains a lower proportion of carbon to silicon carbide than a second portion. If the portion containing the lower proportion of carbon is a layer or coating on a surface of the second portion it may, by suitable selection of the porosity of that layer or coating, provide a pathway for molten silicon to the upper parts of the composite body whereby the silicon reaches those upper parts more readily than by passage through the second portion. Such silicon can then infiltrate the second portion laterally in contrast to the substantially vertical alternative route through the second portion. After siliconising the surface layer or coating, containing an excess of free silicon, may be removed from the second portion. One way of doing this is to leach out the free silicon with alkali to leave, on the surface of the second portion, a reaction-sintered silicon carbide skeleton which can be machined away.

SUMMARY OF THE INVENTION

According to the present invention a green body formed from a coherent mixture of carbon and silicon carbide powders for subsequent siliconising is coated with a suspension comprising finely divided silicon powder in a viscous medium carbonisable on heating.

Also according to the present invention in the production of a reaction-bonded silicon carbide artefact by siliconising a green body formed from a coherent mixture of carbon and silicon carbide powders the surface of the green body is coated with a paste comprising finely divided silicon powder and carbon suspended in a viscous medium carbonisable on heating and the coated body is heated first to decompose the viscous medium and leave silicon and a carbon layer of open cellular structure extending over the surface of the body and then in the presence of molten silicon to convert the carbon layer to a silicon carbide skeleton with open pores through which the molten silicon is drawn to accelerate siliconising of the green body.

The coating is conveniently applied by spraying, spreading with a spatula or brushing and the viscous medium may be decomposed when heating the green body to remove binder from the coherent mixture of carbon and silicon carbide. A temperature in the range 300°–400° C. is generally employed. Silicon powder from the suspension is incorporated in or interspersed with the open cellular structure of the carbon skeleton and the coating should be applied in sufficient thickness to produce, on carbonising the medium, a substantially continuous and uniform silicon/carbon layer about 1 mm thick on the surface of the body. A coating thickness in excess of 0.5 mm is considered necessary for the best results.

Sufficient carbon should be present in the coating to produce a silicon carbide skeleton of density 5–15% of the theoretical density of silicon carbide. If the density is too low the skeleton has no integrity and if the density is too high it is very difficult to remove the skeleton after siliconising. To achieve this density range the ratio of carbon to silicon in the coating should be between 5 and 15 parts of carbon per 100 parts of silicon. The silicon should preferably have a particle size less than 20 microns.

Carboxymethyl cellulose in aqueous solution, readily available commercially as wall-paper paste, is a suitable viscous medium but any other carbonisable medium is likely to be satisfactory provided it can form a sufficiently viscous medium to hold the silicon in suspension, is chemically inert to the other materials used in the performance of the invention and, therefore, preferably, water-based, will adhere sufficiently to the surface of a green body formed from a coherent mixture comprising carbon and silicon carbide powders to maintain a silicon suspension as a coating thereon, and decomposes on heating the coating to leave, in conjunction with other carbon included in the suspension, a carbon layer of open cellular structure on the surface of the body. Because it is necessary to use a more dilute suspension for spraying, and this would result in a lower density skeleton a higher carbon to silicon ratio is used in the paste than when the coating is applied with a brush or spatula. The concentration of the viscous medium should be the lowest consistent with handle-ability. With carboxymethyl cellulose the strength of the aqueous solution should not exceed 10% by weight to avoid surface damage.

On the heating of a coated body of carbon and silicon carbide in the presence of molten silicon to siliconise the body, that is, at a temperature in the range, say 1400°–1600° C., the silicon on the surface of the body melts and reacts with the carbon skeleton to form an open porous silicon carbide skeleton. Any surplus silicon reacts with carbon in the body, converting that carbon also to silicon carbide and further molten silicon is able to climb very rapidly through the silicon carbide skeleton, move laterally into the body and react with the remaining carbon. A porosity of 90–95% may readily be achieved in the skeleton and this so improves the rate of climb of the molten silicon that the lateral movement of silicon through the bulk of the body may become the rate-controlling step although molten silicon is still drawn vertically through the bulk of the green body.

On cooling down of a siliconised body excess silicon (which expands on freezing) is exuded. It bleeds out on to the surface of the body and usually forms nodules which can be removed by leaching with alkali but silicon removal by such means may be non-uniform. When using the coating of the invention however the exuded silicon forms a much more uniform layer in association with the open porous silicon carbide skeleton formed on siliconising and uniform leaching of the excess silicon is accordingly facilitated. After silicon removal the carbide skeleton remaining is friable and may be rubbed off. This is an advantage of the invention. Other advantages are that the coating protects the surface of the green body from oxidation during siliconising, denser green bodies can be siliconised, and less carbon can be used in the green body with the consequence that there is less tendency for the body to crack during the exothermic siliconising reaction and less likelihood of silicon streaking in the siliconised body. Further, longer lengths of green body can be siliconised than previously and it is also possible to siliconise elongate green bodies with their longitudinal axes horizontal. A series of green bodies can be siliconised similarly, the bodies being readily separable after siliconising if the surfaces which would otherwise be in contact are coated prior to siliconising in accordance with this invention. Such a siliconising process may be continuous.

EXAMPLES I

A paste containing 100 gm of silicon of particle size about 1 micron, 5 gm of colloidal graphite and 60 ml of an aqueous solution containing 5% by weight of carboxymethyl cellulose is spread on the surface of a green body of carbon and silicon carbide using a spatula and on heating to 1400° C. a 6.2% dense skeleton of silicon carbide containing silicon is formed.

EXAMPLE II

A slurry containing 100 gm of finely divided silicon, 10 gm of carbon black and 90 ml of an aqueous solution containing 7.5% by weight of carboxymethyl cellulose is sprayed on the surface of a green body of carbon and silicon carbide. Several applications are made to build up a layer of satisfactory thickness. On heating to 1400° C. a 9.4% dense skeleton of silicon carbide containing silicon is formed.

We claim:
1. In the production of a silicon carbide artefact by siliconising a green body formed from a coherent mixture of carbon and silicon carbide powders the improvement comprising coating the surface of the green body with a paste comprising finely divided silicon powder and carbon suspended in a viscous medium carbonisable on heating and heating the coated body first to decompose the viscous medium and leave silicon and a carbon layer of open cellulse structure extending over the surface of the body and then, in the presence of molten silicon, to convert the carbon layer to a silicon carbide skeleton with open pores through which the molten silicon moves to accelerate siliconising of the green body.
2. The production of a silicon carbide artefact as claimed in claim 1 wherein the viscous medium is an aqueous solution of carboxymethyl cellulose.
3. The production of a silicon carbide artefact as claimed in claim 1 or claim 2 wherein the ratio of carbon to silicon in the paste is in the range of 5 to 15 parts of carbon to 100 parts of silicon.

* * * * *